United States Patent
Kim et al.

(10) Patent No.: US 11,609,567 B2
(45) Date of Patent: Mar. 21, 2023

(54) APPARATUS AND METHOD FOR CONTROLLING VEHICLE BASED ON REDUNDANT ARCHITECTURE

(71) Applicant: HL MANDO CORPORATION, Pyeongtaek-si (KR)

(72) Inventors: Hyun Jung Kim, Seongnam-si (KR); Seongjoo Moon, Yongin-si (KR)

(73) Assignee: HL Mando Corporation, Pyeongtaek-si (KR)

( * ) Notice: Subject to any disclaimer, the term of this patent is extended or adjusted under 35 U.S.C. 154(b) by 373 days.

(21) Appl. No.: 16/267,674

(22) Filed: Feb. 5, 2019

(65) Prior Publication Data
US 2019/0243363 A1     Aug. 8, 2019

(30) Foreign Application Priority Data
Feb. 5, 2018 (KR) .................. 10-2018-0013783

(51) Int. Cl.
*G05D 1/00* (2006.01)
*B60W 50/02* (2012.01)
(Continued)

(52) U.S. Cl.
CPC ......... *G05D 1/0077* (2013.01); *B60W 50/023* (2013.01); *B60W 50/0205* (2013.01);
(Continued)

(58) Field of Classification Search
CPC ......... G05D 1/0077; G05D 2201/0213; G05D 1/0816; G05D 1/0055; G05D 1/0088;
(Continued)

(56) References Cited

U.S. PATENT DOCUMENTS 6,650,979 B1 * 11/2003 Kreft .................. B60T 8/326
303/140
6,741,053 B2 * 5/2004 Kifuku .................. B62D 6/10
318/434

(Continued)

FOREIGN PATENT DOCUMENTS

CA      2637226 A1 *  7/2007  .......... B64C 13/505
CN   104395175 A      3/2015
(Continued)

OTHER PUBLICATIONS

DE-102017122166-A1 Translation (Year: 2018).*
Office Action issued in corresponding Korean Application No. 10-2018-0013783, dated Apr. 22, 2019.

*Primary Examiner* — Jeff A Burke
*Assistant Examiner* — Kyle T Johnson
(74) *Attorney, Agent, or Firm* — Morgan, Lewis & Bockius LLP

(57) ABSTRACT

The present disclosure relates to an apparatus and a method for controlling a vehicle, and more particularly to a vehicle control apparatus having a redundant architecture. A vehicle control apparatus according to one embodiment of the present disclosure includes: a receiver, configured to receive sensing information from a vehicle sensor; a first electronic controller, configured to generate a first vehicle control command based on the received sensing information; a monitor, configured to monitor whether the first electronic controller is out of order; and a second electronic controller, configured to generate a second vehicle control command based on the received sensing information if the first electronic controller is out of order.

11 Claims, 5 Drawing Sheets

(51) Int. Cl.
    *B60W 50/023*     (2012.01)
    *B60W 50/029*     (2012.01)

(52) U.S. Cl.
    CPC ... *B60W 50/029* (2013.01); *B60W 2050/0297* (2013.01); *G05D 2201/0213* (2013.01)

(58) Field of Classification Search
    CPC ...... G05D 1/0202; G05D 1/021; G05D 1/101; B60W 50/023; B60W 2050/0292; B60W 50/029; B60W 50/14; B60W 2050/021; B60W 30/09; B60W 20/50; B60W 50/04
    See application file for complete search history.

(56) References Cited

U.S. PATENT DOCUMENTS

| | | | | |
|---|---|---|---|---|
| 6,913,106 | B2* | 7/2005 | Katou | B62D 5/003 |
| | | | | 180/407 |
| 7,222,008 | B2* | 5/2007 | Takahashi | B62D 5/003 |
| | | | | 180/443 |
| 9,061,703 | B2* | 6/2015 | Nishimura | B62D 5/0493 |
| 9,081,653 | B2* | 7/2015 | Ricci et al. | B60W 50/023 |
| 9,563,523 | B2* | 2/2017 | Fuhrman et al. | G06F 11/2038 |
| | | | | 701/41 |
| 10,850,769 | B2* | 12/2020 | Asaka | G01L 25/00 |
| 2003/0155879 | A1 | 8/2003 | Kifuku et al. | |
| 2007/0278032 | A1* | 12/2007 | Sakaguchi | B62D 5/049 |
| | | | | 180/446 |
| 2012/0152647 | A1* | 6/2012 | Uryu | G01L 25/003 |
| | | | | 702/41 |
| 2013/0204484 | A1 | 8/2013 | Ricci | |
| 2014/0039649 | A1* | 2/2014 | Wender | G05B 19/406 |
| | | | | 700/81 |
| 2015/0274202 | A1* | 10/2015 | Tsunoda | B62D 6/10 |
| | | | | 180/446 |
| 2016/0264150 | A1 | 9/2016 | Freiwald et al. | |
| 2016/0306720 | A1 | 10/2016 | Fuhrman et al. | |
| 2018/0018208 | A1 | 1/2018 | Zettler et al. | |
| 2018/0093703 | A1* | 4/2018 | Sasaki | B62D 5/049 |
| 2018/0113476 | A1* | 4/2018 | Giles | G05D 1/0295 |
| 2019/0243363 | A1* | 8/2019 | Kim | G05D 1/0077 |
| 2019/0258251 | A1* | 8/2019 | Ditty | G06K 9/00805 |
| 2020/0076343 | A1* | 3/2020 | Zhang | H02P 5/46 |
| 2020/0139982 | A1* | 5/2020 | Sakamoto | G05B 9/02 |
| 2021/0163026 | A1* | 6/2021 | Ochida | B60W 50/035 |

FOREIGN PATENT DOCUMENTS

| | | | | |
|---|---|---|---|---|
| CN | 104443247 A | | 3/2015 | |
| CN | 106054852 A | | 10/2016 | |
| DE | 102017122166 A1 | * | 3/2018 | ......... B62D 5/049 |
| JP | 2014-54876 A | | 3/2014 | |
| KR | 10-2016-0110203 A | | 9/2016 | |
| WO | WO-2009040137 A1 | * | 4/2009 | ......... B60W 50/029 |

* cited by examiner

APPARATUS AND METHOD FOR CONTROLLING VEHICLE BASED ON REDUNDANT ARCHITECTURE

CROSS REFERENCE TO RELATED APPLICATION

This application claims priority from Korean Patent Application No. 10-2018-0013783, filed on Feb. 5, 2018, which is hereby incorporated by reference for all purposes as if fully set forth herein.

BACKGROUND OF THE INVENTION

1. Field of the Invention

The present disclosure relates to an apparatus and a method for controlling a vehicle, and more particularly to a vehicle control apparatus having a redundant architecture.

2. Description of the Prior Art

In an Electronic Power steering (EPS) system, steering control is performed by an electronic controller (ECU) based on information collected via a vehicle sensor. To improve the stability of steering in the EPS system, studies are being conducted on a redundant structure having a plurality of sensors or a plurality of electronic control devices. In a vehicle control apparatus having a redundant architecture that includes a plurality of electronic controllers, the electronic controllers perform vehicle control using the same algorithm. Thus, a defect in the algorithm may cause a problem with safety and reliability, and a separate algorithm provided for monitoring failure in each electronic controller may entail an excessive amount of computation.

SUMMARY OF THE INVENTION

An aspect of the present disclosure is to provide a vehicle control technique based on a redundant architecture that enhances stability.

Another aspect of the present disclosure is to provide a vehicle control technique based on a redundant architecture that reduces the amount of computations.

According to one aspect of the present disclosure, a vehicle control apparatus having a redundant architecture may include: a receiver, configured to receive sensing information from a vehicle sensor; a first electronic controller, configured to generate a first vehicle control command based on the received sensing information; a monitor configured to monitor whether the first electronic controller is out of order; and a second electronic controller configured to generate a second vehicle control command based on the received sensing information if the first electronic controller is out of order.

According to another aspect of the present disclosure, a vehicle control method based on a redundant architecture may include: receiving sensing information from a vehicle sensor; generating, through a first electronic controller, a first vehicle control command based on the received sensing information; monitoring whether the first electronic controller is out of order; and generating, through a second electronic controller, a second vehicle control command based on the received sensing information if the first electronic controller is out of order.

According to an embodiment of the present disclosure, it is possible to enable vehicle control based on a redundant architecture that enhances stability.

According to another embodiment of the present disclosure it is possible to enable vehicle control based on a redundant architecture that reduces the amount of computation.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
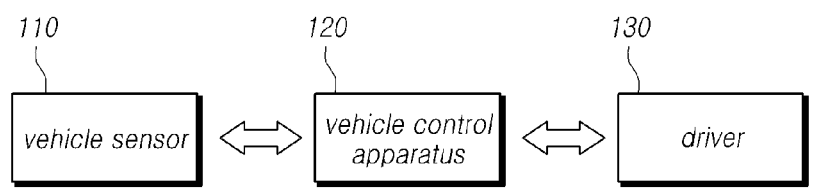
FIG. 1 illustrates the configuration of a vehicle control system having a redundant architecture according to an embodiment of the present disclosure.

The present disclosure may have various modifications and embodiments, and thus particular embodiments illustrated in the drawings will be described in detail in the following description. However, it should be understood that there is no intent to limit the present disclosure to the particular forms disclosed, but on the contrary, the present disclosure is to cover all modifications, equivalents, and alternatives falling within the spirit and scope of the disclosure. Further, in the description of the present disclosure, if it is determined that the detailed description of the related well-known technologies unnecessarily make the subject matter of the present disclosure unclear, the detailed description will be omitted. A singular expression as used in the specification and the claims should be construed as meaning "one or more" unless indicated otherwise.

Hereinafter, embodiments of the present disclosure will be described in detail with reference to the accompanying drawings, and in the description with reference to the accompanying drawings, the same or corresponding components have the same reference numeral, and a duplicate description therefor will be omitted.

FIG. 1 illustrates the configuration of a vehicle control system having a redundant architecture according to an embodiment of the present disclosure.

Referring to FIG. 1, the vehicle control system 100 according to the embodiment may include a vehicle sensor 110, a vehicle control apparatus 120, and a driver 130.

The vehicle sensor 110 is any sensor mounted on a vehicle, and may be a sensor unit including a plurality of sensors. Each sensor may generate sensing information, which is a sensing result, and may transmit the sensing information to the vehicle control apparatus 120.

In one embodiment, the vehicle sensor 110 may include a steering angle sensor. For example, the vehicle sensor 110 may sense a steering angle input from a driver through a steering wheel and may transmit information on the sensed steering angle to the vehicle control apparatus 120.

In one embodiment, the vehicle sensor 110 may include a torque sensor. For example, the vehicle sensor 110 may sense steering torque input by the driver through the steering wheel and may transmit a sensed torque signal to the vehicle control apparatus 120.

In one embodiment, the vehicle sensor 110 may include a vehicle speed sensor. For example, the vehicle speed sensor may measure the speed of the vehicle to generate vehicle speed information and may transmit the generated vehicle speed information to the vehicle control apparatus 120.

The vehicle sensor 110 is not limited to the sensors described above in this disclosure and may include various sensors that may be used to control the steering of the vehicle.

The vehicle control apparatus 120 may control any operation related to driving of the vehicle, such as steering of the vehicle. In addition, the vehicle control apparatus 120 has a redundant architecture including a plurality of electronic controllers that generate vehicle control commands to control driving of the vehicle, in which the vehicle may be controlled by a first electronic controller, and, if the first electronic controller is out of order, the vehicle may be controlled through a second electronic controller 240. Specifically, the vehicle control apparatus 120 may generate a vehicle control command to control the vehicle based on the sensing information received from the vehicle sensor 110, and may transmit the generated vehicle control command to the driver 130. Details of the vehicle control apparatus 120 will be described later with reference to FIGS. 2 to 5.

In one embodiment, the vehicle control apparatus 120 has a redundant architecture including a plurality of electronic controllers that generate vehicle control commands to control driving of the vehicle, in which the vehicle may be controlled by both a first electronic controller and a second electronic controller.

Specifically, the first electronic controller and the second electronic controller may individually generate vehicle control commands to control the driver based on the sensing information received from the vehicle sensor. Here, the first electronic controller and the second electronic controller may generate vehicle control commands using different algorithms.

The driver 130 may control overall driving of the vehicle based on the vehicle control command received from the vehicle control apparatus 120.

In one embodiment, the driver 130 may be an assist motor. For example, the driver 130 may receive a vehicle control command including a target current signal from the vehicle control apparatus 120 and may provide steering-assist force based on the received target current signal.

The vehicle sensor 110, the vehicle control apparatus 120, and the driver 130 may be interconnected based on a vehicle communication tool, such as CAN communication.

Figure 2:
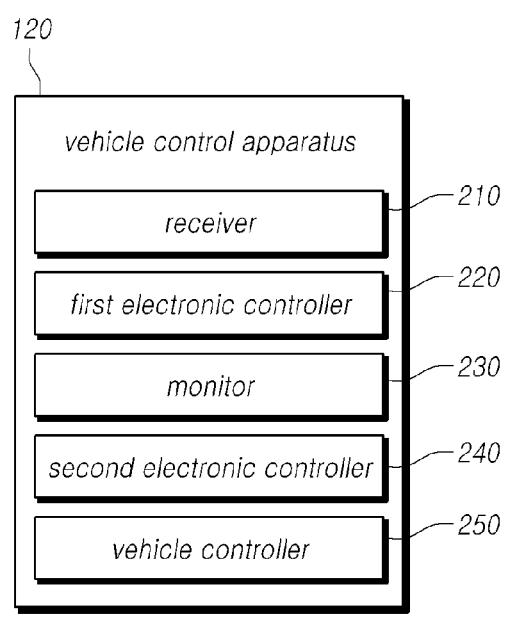
FIG. 2 is a block diagram illustrating a vehicle control apparatus according to an embodiment of the present disclosure.

FIG. 2 is a block diagram illustrating a vehicle control apparatus according to an embodiment of the present disclosure.

Referring to FIG. 2, the vehicle control apparatus 120 according to the embodiment may include a receiver 210, a first electronic controller 220, a monitor 230, a second electronic controller 240, and a vehicle controller 250.

The receiver 210 may receive sensing information. Specifically, the receiver 210 may receive sensing information sensed by the vehicle sensor 110, such as a torque sensor or a steering angle sensor.

The first electronic controller 220 may generate a first vehicle control command. Specifically, the first electronic controller 220 may process the sensing information received from the vehicle sensor 110 based on a pre-stored algorithm, thereby generating a first vehicle control command to control driving of the vehicle. Here, the pre-stored algorithm refers to a general algorithm used in an electronic control unit (ECU) of the vehicle, and a detailed description thereof will be omitted.

In one embodiment, the first electronic controller 220 may receive a torque signal from the vehicle sensor 110 and may generate a first vehicle control command including a target torque signal based on the received torque signal.

In one embodiment, the first electronic controller 220 may receive steering angle information from the vehicle sensor 110 and may generate a first vehicle control command including a target steering angle signal based on the received steering angle information.

In one embodiment, the second electronic controller 240 may generate a second vehicle control command to be used, along with the first vehicle control command, to control the vehicle. Specifically, the second electronic controller 240 may process the sensing information received from the vehicle sensor 110 based on a pre-stored algorithm, thereby generating a second vehicle control command to control driving of the vehicle along with the first vehicle control command. Here, the algorithm used by the second electronic controller 240 may be different from the algorithm used by the first electronic controller 220. The monitor 230 may monitor the operation of the electronic controllers. Specifically, the monitor 230 may monitor the operation of the electronic controllers and may determine whether the electronic controllers are out of order based on the monitoring result.

In one embodiment, the monitor 230 may monitor the operation of a main electronic controller. For example, if an electronic control device has a redundant architecture including a main electronic controller and a sub-electronic controller, the monitor 230 may monitor whether the main electronic controller is out of order. Here, the monitor 230 may transmit the result of monitoring whether the main electronic controller is out of order to the sub-electronic controller or the vehicle controller 250. In another embodiment, if the vehicle is controlled by each of the vehicle control commands generated by the first electronic controller 220 and the second electronic controller 240, the monitor 230 may monitor the operation of each of the first electronic controller and the second electronic controller, and may allow the electronic controllers to exchange the monitoring result, or may transmit the monitoring result to the vehicle controller 250.

In one embodiment, the monitor 230 may determine whether an electronic controller is out of order based on input and output information of the electronic control device. Specifically, the monitor 230 may compare the sensing information received from the vehicle sensor 110 and/or a vehicle control command output from the electronic controller with preset pattern information, thereby determining whether the electronic controller is out of order. For example, the monitor 230 may compare a pre-stored torque pattern, which indicates normal range information of a torque signal as sensing information and a target torque signal as a vehicle control command, with a torque signal actually input to the electronic controller and/or a target torque signal actually output from the electronic controller, thereby determining whether the electronic controller is out of order.

The second electronic controller 240 may control driving of the vehicle if the first electronic controller 220 is out of order. Specifically, if it is determined that the first electronic controller 220 is out of order, the second electronic controller 240 may generate a second vehicle control command to control driving of the vehicle based on the received sensing information and a pre-stored algorithm.

In one embodiment, the second electronic controller 240 may generate a second vehicle control command based on an algorithm that is different from that used by the first electronic controller 220. Here, the algorithm that is different from that used by the first electronic controller 220 is an algorithm that is generally used for an electronic control device of a vehicle and is different from the algorithm used by the first electronic controller 220, and a detailed description thereof will be omitted.

In one embodiment, the second electronic controller 240 may generate a second vehicle control command using sensing information or a combination of sensing information that is different from the sensing information or a combination of sensing information used in the algorithm for the first electronic controller 220.

In one embodiment, the second electronic controller 240 may perform some of the functions of the first electronic controller 220. For example, if the first electronic controller 220 is capable of generating a vehicle control command to control overall driving of the vehicle, the second electronic controller 240 may generate only a vehicle control command related to steering control, among aspects of driving control of the vehicle. Further, the second electronic controller 240 may generate a vehicle control command for urgent control of the vehicle. For example, the second electronic controller 240 may generate a vehicle control command to control a steering wheel, which needs to be necessarily controlled in an emergency situation, among the functions of the first electronic controller 220.

The vehicle controller 250 may control driving of the vehicle based on the vehicle control commands generated by the electronic controllers. Specifically, if the first electronic controller 220 is not out of order, the vehicle controller 250 may control driving of the vehicle based on the first vehicle control command generated by the first electronic controller 220. Alternatively, the vehicle controller 250 may control driving of the vehicle based on the vehicle control command generated by each of the first electronic controller 220 and the second electronic controller 240. If it is determined that the first electronic controller 220 is out of order, the vehicle controller 250 may stop the first electronic controller 220 from controlling the vehicle and may control driving of the vehicle based on the second vehicle control command generated by the second electronic controller 240.

The first electronic controller 220 and the second electronic controller 240 may be configured as physically separate electronic control devices, the monitor 230 may be included in the first electronic controller 220, and the vehicle controller 250 may be included in the second electronic controller 240.

Figure 3:
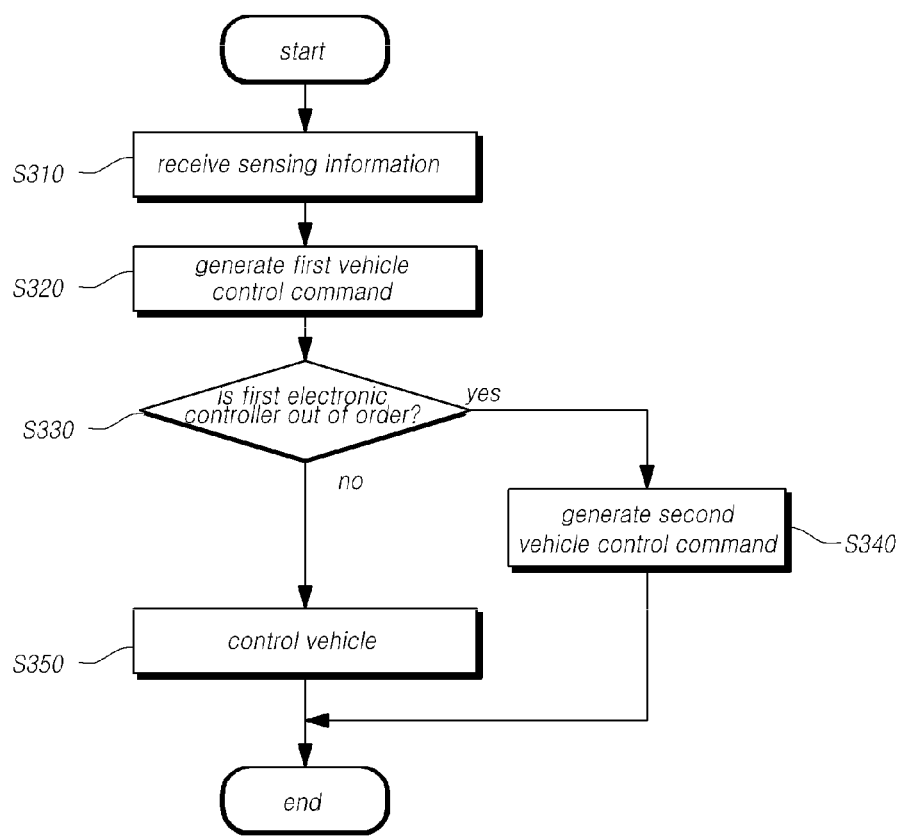
FIG. 3 is a flowchart illustrating a vehicle control method of a redundant architecture according to an embodiment of the present disclosure.

FIG. 3 is a flowchart illustrating a vehicle control method having a redundant architecture according to an embodiment of the present disclosure.

Hereinafter, the method is described as being performed, for example, by the vehicle control apparatus 120 illustrated in FIG. 1, and it will be apparent that the description of the vehicle control apparatus 120 can be extended to the method.

In operation S310, sensing information is received. Specifically, the vehicle control apparatus 120 may receive sensing information from a vehicle sensor 110. The vehicle sensor 110 may include various sensors that can be used to control steering of the vehicle.

In one embodiment, the vehicle control apparatus 120 may receive a sensed torque signal from a torque sensor.

In one embodiment, the vehicle control apparatus 120 may receive a sensed steering angle signal from a steering angle sensor.

In operation S320, a first vehicle control command is generated. Specifically, the vehicle control apparatus 120 may generate a first vehicle control command to control the driving of the vehicle based on the sensing information received through a first electronic controller 220.

In operation S330, it is determined whether the first electronic controller 220 is out of order. Specifically, the vehicle control apparatus may monitor the operation of the first electronic controller 220 and may determine whether the first electronic controller 220 is out of order based on the monitoring result.

In one embodiment, the vehicle control apparatus 120 may determine whether the first electronic controller 220 is out of order based on the received sensing information and the first vehicle control command generated by the first electronic controller 220. For example, the vehicle control apparatus 120 may compare actual sensing information and/or the first vehicle control command with pre-stored pattern information in the normal range with respect to sensing information and a vehicle control command, thereby determining whether the first electronic controller 220 is out of order.

In operation S340, a second vehicle control command is generated. Specifically, if it is determined that the first electronic controller 220 is out of order, the vehicle control apparatus 120 may generate a second vehicle control command to control driving of the vehicle based on the sensing information received through the second electronic controller 240.

In one embodiment, the second electronic controller 240 may generate a second vehicle control command based on an algorithm that is different from that used by the first electronic controller 220. Here, the algorithm that is different from that used by the first electronic controller 220 is an algorithm that is generally used for an electronic control device of a vehicle and is different from the algorithm used by the first electronic controller 220, and a detailed description thereof will be omitted.

In one embodiment, the second electronic controller 240 may generate a second vehicle control command using sensing information or a combination of sensing information that is different from the sensing information or a combination of sensing information used in the algorithm for the first electronic controller 220.

In one embodiment, the second electronic controller 240 may perform some of the functions of the first electronic controller 220. For example, if the first electronic controller 220 is capable of generating a vehicle control command to control overall driving of the vehicle, the second electronic controller 240 may generate only a vehicle control command related to steering control, among aspects of driving control of the vehicle. Further, the second electronic controller 240 may generate a vehicle control command for urgent control of the vehicle. For example, the second electronic controller 240 may generate a vehicle control command to control a steering wheel, which needs to be necessarily controlled in an emergency situation, among the functions of the first electronic controller 220.

In operation S350, driving of the vehicle is controlled. Specifically, if it is determined that the first electronic controller 220 is not out of order, the vehicle control apparatus 120 may control the operation of the vehicle based on the first vehicle control command generated by the first electronic controller 220. Further, if it is determined that the first electronic controller 220 is out of order, the vehicle control apparatus 120 may stop the first electronic controller 220 from controlling the vehicle and may control driving of the vehicle based on the second vehicle control command generated by the second electronic controller 240.

Figure 4:
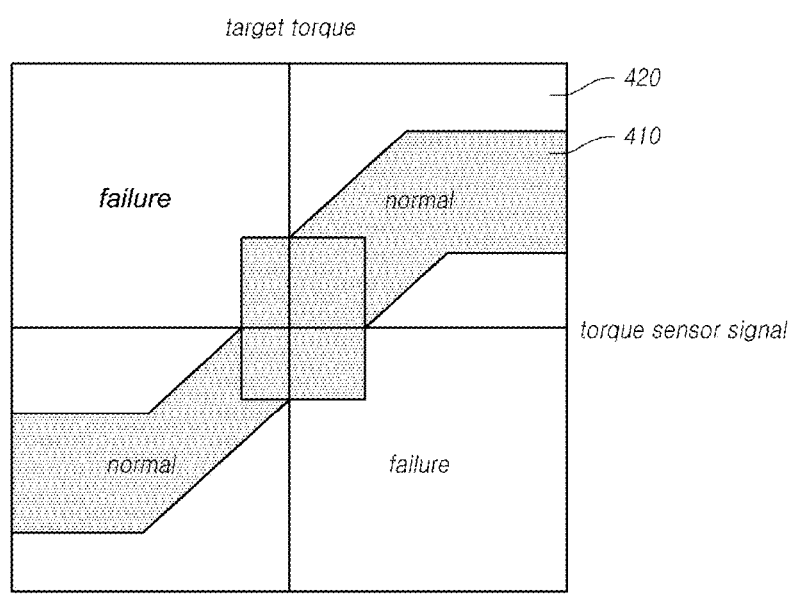
FIG. 4 illustrates an example of a pre-stored torque pattern according to an embodiment of the present disclosure.

FIG. 4 illustrates an example of a pre-stored torque pattern according to an embodiment of the present disclosure.

FIG. 4 shows a target torque signal corresponding to a received torque sensor signal. The torque sensor signal and the target torque signal may be set to range from a negative (or positive) torque value to a positive (or negative) torque value with respect to the left (or right) direction of a steering wheel. Specifically, in the case where the received torque sensor signal is a negative value, if a first electronic controller 220 generates a first vehicle control command including a target torque signal in a normal range, as illustrated in FIG. 4, the vehicle control apparatus 120 may determine that the first electronic controller 220 is normal. If the first electronic controller 220 generates a first vehicle control command including a target torque signal out of the normal range, as illustrated in FIG. 4, the vehicle control apparatus 120 may determine that the first electronic controller 220 is out of order. Accordingly, the vehicle control apparatus 120 can quickly determine the occurrence of failure through comparison with a pre-stored torque pattern without using a complicated algorithm requiring a large amount of computations in order to determine whether the first electronic controller 220 is out of order.

Figure 5:
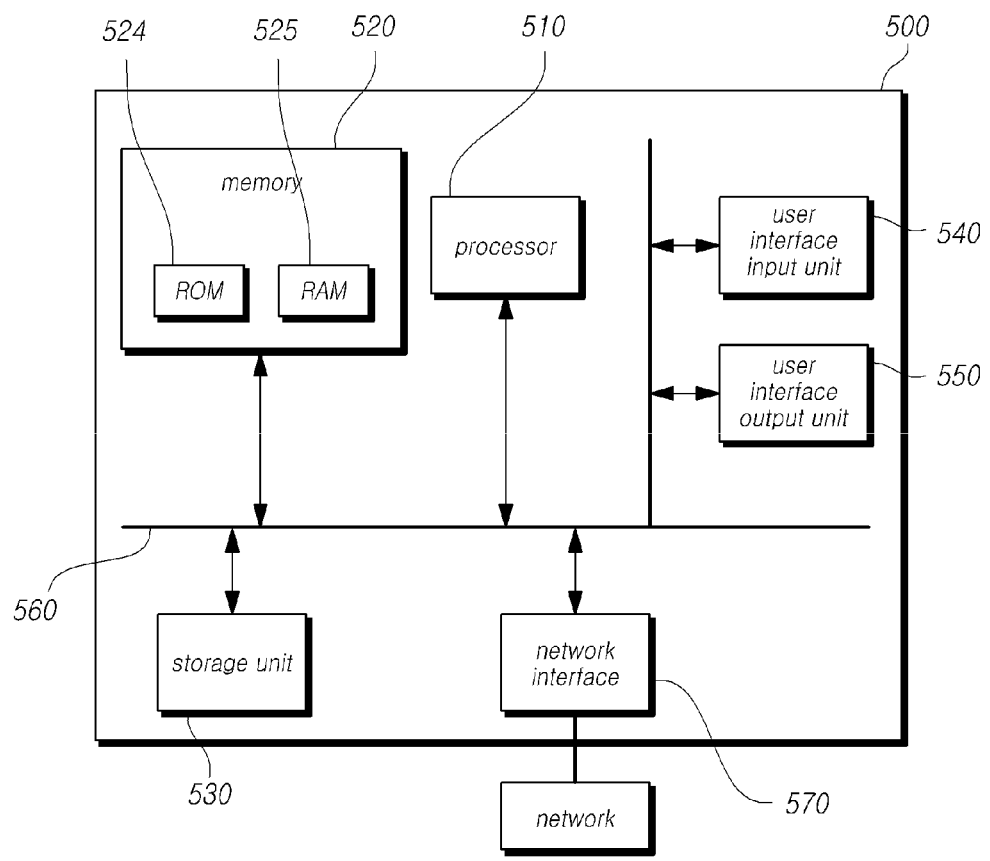
FIG. 5 is a block diagram illustrating a vehicle control apparatus according to another embodiment of the present disclosure.

FIG. 5 is a block diagram illustrating a vehicle control apparatus according to another embodiment of the present disclosure.

As illustrated in FIG. 5, a computer system 500, such as the vehicle control apparatus 120, may include at least one component among one or more processors 510, a memory 520, a storage 530, a user interface inputter 540, and a user interface outputter 550, and these components may communicate with each other via a bus 560. In addition, the computer system 500 may also include a network interface 570 for accessing a network. The processor 510 may be a CPU or a semiconductor device that executes processing instructions stored in the memory 520 and/or the storage 530. The memory 520 and the storage 530 may include various types of volatile/non-volatile storage media. For example, the memory may include ROM 524 and RAM 525.

The methods according to the exemplary embodiments of the present disclosure may be in a form of program commands executed through various computer means to be recorded in a computer readable medium. The computer readable medium may include a program command, a data file, a data structure, and the like independently or in combination.

The aforementioned hardware device may be configured to operate as one or more software modules in order to perform the operation of the present disclosure, and vice versa.

The present disclosure has been described above in connection with the embodiments thereof. It will be understood by those skilled in the art to which the present disclosure belongs that the present disclosure may be implemented in modified forms without departing from the essential characteristics of the present disclosure.

Therefore, the embodiments disclosed herein should be considered from an illustrative point of view, rather than a limitative point of view. The scope of the present disclosure is found not in the above description but in the accompanying claims, and all differences falling within the scope equivalent to the claims should be construed as being included in the present disclosure.

What is claimed is:

1. A vehicle control apparatus having a redundant architecture, the vehicle control apparatus comprising:
a receiver configured to receive first sensing information from a vehicle sensor;
a first electronic controller configured to generate a first vehicle control command based on the first sensing information;
a monitor configured to monitor whether the first electronic controller is out of order;
a second electronic controller configured to generate a second vehicle control command based on the first sensing information if the first electronic controller is out of order, and
a controller configured to control the vehicle using the first vehicle control command generated by the first electronic controller and the second vehicle control command generated by the second electronic controller,
wherein the second electronic controller generates the second vehicle control command using a combination of the first sensing information and second sensing information that is different from the first sensing information,
wherein the monitor is included in the first electronic controller, and the controller is included in the second electronic controller, and
wherein the monitor determines that the first electronic controller is out of order if a target torque signal as the first vehicle control command is not in a normal range in a pre-stored torque pattern, and the pre-stored torque pattern representing a relationship of the target torque signal corresponding to a torque sensor signal received from the vehicle sensor, and
wherein the second electronic controller generates the second vehicle control command using an algorithm different from an algorithm for the first electronic controller.

2. The vehicle control apparatus of claim 1, wherein the second electronic controller generates the second vehicle control command using the first sensing information or a combination of the first sensing information and third sensing information used in the algorithm for the first electronic controller.

3. The vehicle control apparatus of claim 1, wherein the second electronic controller generates, based on the first sensing information, the second vehicle control command to be used for controlling along with the first vehicle control command, and the controller stops the first electronic controller from controlling the vehicle and controls the vehicle based on the second vehicle command if the first electronic controller is out of order.

4. The vehicle control apparatus of claim 1, wherein the second vehicle control command generated by the second electronic controller is at least one of the first vehicle control command.

5. The vehicle control apparatus of claim 4, wherein the at least one of the first vehicle control command includes an emergency control of the vehicle.

6. The vehicle control apparatus of claim 1, wherein the monitor determines whether the first electronic controller is out of order based on the first sensing information and the first vehicle control command.

7. The vehicle control apparatus of claim 1, further comprising a vehicle controller configured to control a vehicle based on the first vehicle control command,
wherein, if the first electronic controller is out of order, the vehicle controller stops the first electronic controller from controlling the vehicle and controls the vehicle based on the second vehicle control command.

8. A vehicle control method based on a redundant architecture, the vehicle control method comprising:
receiving first sensing information from a vehicle sensor;
generating, through a first electronic controller, a first vehicle control command based on the first sensing information;
monitoring, by a monitor, whether the first electronic controller is out of order;
generating, through a second electronic controller, a second vehicle control command based on the first sensing information if the first electronic controller is out of order,
controlling, by a controller, a vehicle based on the first vehicle control command; and
controlling, by a controller, the vehicle based on the second vehicle control command if the first electronic controller is out of order,
wherein the generating of the second vehicle control command generates the second vehicle control command using a combination of the first sensing information and second sensing information that is different from the first sensing information,
wherein the monitor is included in the first electronic controller, and the controller is included in the second electronic controller, and
wherein monitoring comprises determining that the first electronic controller is out of order if a target torque signal as the first vehicle control command is not in a normal range in a pre-stored torque pattern, and the pre-stored torque pattern representing a relationship of the target torque signal corresponding to a torque sensor signal received from the vehicle sensor, and
wherein the generating of the second vehicle control command generates the second vehicle control command using an algorithm different from an algorithm used for generating the first vehicle control command.

9. The vehicle control method of claim 8, wherein the generating of the second vehicle control command generates the second vehicle control command using the first sensing information or a combination of the first sensing information and third sensing information used in the algorithm for the first electronic controller.

10. The vehicle control method of claim 8, wherein the monitoring determines whether the first electronic controller is out of order by comparing the first sensing information and the first vehicle control command with a pre-stored pattern, and
the generating of the second vehicle control command generates the second vehicle control command using an algorithm different from an algorithm for the first electronic controller.

11. A vehicle control apparatus having a redundant architecture, the vehicle control apparatus comprising:
a receiver configured to receive first sensing information from a vehicle sensor;
a first electronic controller configured to generate a first vehicle control command based on the first sensing information;
a monitor configured to monitor whether the first electronic controller is out of order;
a second electronic controller configured to generate a second vehicle control command based on the first sensing information if the first electronic controller is out of order, and
a controller configured to control the vehicle using the first vehicle control command generated by the first electronic controller and the second vehicle control command generated by the second electronic controller,
wherein the monitor determines whether the first electronic controller is out of order based on the first sensing information and the first vehicle control command,
wherein the monitor determines whether the first electronic controller is out of order by comparing at least one of a torque sensor signal as the first sensing information or a target torque signal as the first vehicle control command with a pre-stored torque pattern,
wherein the monitor is included in the first electronic controller, and the controller is included in the second electronic controller, and
wherein the monitor determines that the first electronic controller is out of order if the target torque signal is not in a normal range in the pre-stored torque pattern, and the pre-stored torque pattern representing a relationship of the target torque signal corresponding to the torque sensor signal received from the vehicle sensor, and
wherein the second electronic controller generates the second vehicle control command using an algorithm different from an algorithm for the first electronic controller.

* * * * *